(12) United States Patent
Chen et al.

(10) Patent No.: US 12,363,023 B2
(45) Date of Patent: Jul. 15, 2025

(54) ROUTE REFRESH METHOD, APPARATUS, AND SYSTEM

(71) Applicant: HUAWEI TECHNOLOGIES CO., LTD., Guangdong (CN)

(72) Inventors: Shuanglong Chen, Beijing (CN); Hongjie Yang, Beijing (CN); Zhenbin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 18/486,275

(22) Filed: Oct. 13, 2023

(65) Prior Publication Data

US 2024/0039829 A1 Feb. 1, 2024

Related U.S. Application Data

(63) Continuation of application No. PCT/CN2022/083043, filed on Mar. 25, 2022.

(30) Foreign Application Priority Data

Apr. 15, 2021 (CN) .......................... 202110405448.1

(51) Int. Cl.
  *H04L 45/02* (2022.01)
  *H04L 45/24* (2022.01)
(52) U.S. Cl.
  CPC .............. *H04L 45/02* (2013.01); *H04L 45/24* (2013.01)

(58) Field of Classification Search
  None
  See application file for complete search history.

(56) References Cited

U.S. PATENT DOCUMENTS

| | | | |
|---|---|---|---|
| 2006/0171404 A1* | 8/2006 | Nalawade | H04L 45/02 370/428 |
| 2008/0089231 A1* | 4/2008 | Appanna | H04L 45/028 370/235 |
| 2013/0259058 A1 | 10/2013 | Vairavakkalai | |
| 2016/0241457 A1 | 8/2016 | Semwal et al. | |
| 2017/0093961 A1* | 3/2017 | Pacella | H04L 41/5051 |
| 2020/0358886 A1 | 11/2020 | Wei et al. | |

OTHER PUBLICATIONS

Extended European Search Report issued in EP22787361.9, dated Jul. 12, 2024, 12 pages.

(Continued)

*Primary Examiner* — June Sison

(57) ABSTRACT

The present disclosure provides a route refresh method, apparatus, and system, and relates to the field of communication technologies. In solutions provided in the present disclosure, a first network device can send a plurality of first routes to a second network device in a parallel transmission manner, and can send an end indication after determining that the second network device receives the plurality of first routes. Therefore, it can be ensured that in a parallel transmission scenario, the end indication does not reach the second network device earlier than the plurality of first routes. This can avoid a problem that a service flow is interrupted because the second network device untimely ages a route that is not refreshed in a routing table.

15 Claims, 5 Drawing Sheets

(56) References Cited

OTHER PUBLICATIONS

S. Sangli et al:"Graceful Restart Mechanism for BGP",Network Working Group, Request for Comments: 4724, Category: Standards Track, Jan. 2007, total 15 pages.

J. Dong et al:"BGP End-of-RIB Usage Extension and Negotiation draft-dong-idr-end-of-rib-use-extension-00",Network Working Group, Internet-Draft, Intended status: Standards Track, Expires: Jan. 5, 2012, Jul. 4, 2011, total 6 pages.

P. Marques et al:"Constrained Route Distribution for Border Gateway Protocol/MultiProtocol Label Switching (BGP/MPLS) Internet Protocol (IP) Virtual Private Networks (VPNs)",Network Working Group, Request for Comments: 4684, Category: Standards Track, Nov. 2006, total 14 pages.

Y. Rekhter, Ed et al:"A Border Gateway Protocol 4 (BGP-4)",Network Working Group, Request for Comments: 4271, Category: Standards Track, Jan. 2006, total 104 pages.

K. Patel et al:"Enhanced Route Refresh Capability for BGP-4",Internet Engineering Task Force (IETF), Request for Comments: 7313, Category: Standards Track, ISSN: 2070-1721, Jul. 2014, total 8 pages.

International Search Report and Written Opinion issued in PCT/CN2022/083043, dated Jun. 29, 2022, 10 pages.

\* cited by examiner

ROUTE REFRESH METHOD, APPARATUS, AND SYSTEM

CROSS-REFERENCE TO RELATED APPLICATIONS

This application is a continuation of International Application No. PCT/CN2022/083043, filed on Mar. 25, 2022, which claims priority to Chinese Patent Application No. 202110405448.1, filed on Apr. 15, 2021. The disclosures of the aforementioned applications are hereby incorporated by reference in their entireties.

TECHNICAL FIELD

The present disclosure relates to the field of communication technologies, and in particular, to a route refresh method, apparatus, and system.

BACKGROUND

A border gateway protocol (BGP) is a dynamic routing protocol used between autonomous systems (ASs). After establishing a BGP connection, two network devices each may advertise a BGP route to each other via a BGP update message. A pair of network devices that have a BGP connection relationship can be peers of each other.

After a graceful restart (GR) of a network device, or a route receiving policy for a peer is modified, the peer of the network device needs to re-advertise a BGP route to the network device. After sending a to-be-advertised BGP route, the peer further needs to send an end indication to the network device. The network device may refresh a routing table based on the BGP route re-advertised by the peer of the network device, and may delete, from the routing table after receiving the end indication, a route other than the BGP route re-advertised by the peer, in other words, the network device may age, based on the end indication, a BGP route that is not refreshed in the routing table.

However, if the peer sends a plurality of to-be-advertised BGP routes and an end indication in a multi-path parallel manner, the end indication may reach the network device earlier than a part of BGP routes. Correspondingly, when aging the routing table based on the end indication, the network device may delete a part of BGP routes that are not received, resulting in interruption of a part of service flows.

SUMMARY

The present disclosure provides a route refresh method, apparatus, and system, to resolve a technical problem in a related technology that a part of routes are deleted because a network device untimely receives or processes an end indication, and consequently a service flow is interrupted.

According to one aspect, a route refresh method is provided. The method may be applied to a first network device. The method includes: sending a plurality of first routes to a second network device in a parallel transmission manner, and after determining that the second network device receives the plurality of first routes, sending an end indication to the second network device, where the plurality of first routes are used by the second network device to refresh a routing table, and the end indication indicates that the sending of the plurality of first routes has been completed.

Based on the method provided in the present disclosure, it can be ensured that in a parallel transmission scenario, the end indication does not reach the second network device earlier than the first route. This can avoid a problem that a service flow is interrupted because the second network device untimely ages, based on the end indication, a route that is not refreshed in a routing table.

Optionally, a process in which the first network device determines that the second network device receives the plurality of first routes includes: determining, based on an acknowledgment message sent by the second network device for the first route, that the second network device receives the plurality of first routes.

After receiving the first route, the second network device may feed back the acknowledgment message to the first network device, and the first network device may accurately determine, based on the received acknowledgment message, whether the second network device has received all the first routes.

Optionally, the first network device may include a routing module and a transmission module. The routing module runs a routing protocol, and the transmission module runs a transmission protocol. In a possible implementation, before the first network device sends the end indication to the second network device, the method may further include: The routing module sends the plurality of first routes and the end indication to the transmission module, and configures a transmission tag for the transmission module. The transmission tag indicates the transmission module to send, after determining that the second network device receives the plurality of first routes, the end indication to the second network device.

Based on the foregoing implementation, the routing module only needs to configure the transmission tag for the transmission module, and does not need to control a sending time sequence of the end indication, thereby effectively simplifying an operation of the routing module.

In another possible implementation, before the first network device sends the end indication to the second network device, the method may further include: The routing module sends the plurality of first routes to the transmission module, and sends the end indication to the transmission module after determining, based on a notification message provided by the transmission module, that the second network device receives the plurality of first routes.

Based on the foregoing implementation, the transmission module only needs to send the route and the end indication that are provided by the routing module, and does not need to control a sending time sequence of the end indication. This can effectively simplify an operation of the transmission module.

Optionally, before the first network device sends the end indication to the second network device, the method may further include: after obtaining a second route, sending the second route to the second network device if determining that sending of data in a data stream to which the second route belongs has been completed, where the second route is a route used to refresh any one of the first routes, or the second route is a route learned by the first network device after the first network device sends the plurality of first routes.

In a process of transmitting the plurality of first routes, if obtaining the second route, the first network device may send the second route to the second network device in time without waiting for all reconciliation routes to be sent, so that the second network device can refresh the routing table by using the second route in time to ensure that a service flow related to the second route can be normally forwarded.

Optionally, a process in which the first network device sends the plurality of first routes to the second network device in the parallel transmission manner may include: sending the plurality of first routes to the second network device in the parallel transmission manner based on a route refresh message sent by the second network device; or sending the plurality of first routes to the second network device in the parallel transmission manner after disconnecting from the second network device and re-establishing a connection to the second network device.

The route refresh message may be sent by the second network device after the second network device modifies a route receiving policy for the first network device. In addition, when needing to perform a graceful restart, the second network device may first be disconnected from the first network device, and may re-establish a connection to the first network device after the graceful restart is completed.

Optionally, the process in which the first network device sends the plurality of first routes to the second network device in the parallel transmission manner may include: sending the plurality of first routes in parallel through a plurality of paths between the first network device and the second network device; or sending a plurality of data streams in parallel through one path between the first network device and the second network device, where each data stream includes at least one first route.

The solutions provided in the present disclosure may be applied to a scenario in which there are a plurality of paths between two network devices, and may also be applied to a scenario in which a plurality of data streams are sent in parallel between two network devices through one path. It can be learned that the solutions provided in the present disclosure are of good compatibility, and can be flexibly applied to different scenarios.

Optionally, the plurality of paths between the first network device and the second network device may be established according to a quick UDP Internet connection (QUIC) protocol. A UDP refers to a user datagram protocol.

The QUIC protocol is a UDP-based low-latency Internet transport layer protocol. The QUIC protocol can process more connections and has advantages such as high security and low latency.

According to another aspect, a route refresh method is provided, and is applied to a second network device. The method includes: receiving a plurality of first routes sent by a first network device in a parallel transmission manner; receiving a first end indication sent by the first network device; and after refreshing a routing table by using the plurality of first routes, deleting a route other than the plurality of first routes from the routing table based on the first end indication, where the first end indication is sent by the first network device after the first network device determines that the second network device has received the plurality of first routes.

The second network device receives the first end indication only after receiving the plurality of first routes, and the second network device may age, based on the first end indication, a route that is not refreshed in the routing table after refreshing the routing table by using the plurality of first routes. This can avoid a problem that some routes are inadvertently deleted because of untimely processing the end indication, and consequently some service flows are interrupted.

Optionally, the method may further include: after receiving the first route, sending an acknowledgment message for the first route to the first network device, so that the first network device determines that the second network device has received the first route.

Optionally, before receiving the end indication sent by the first network device, the method may further include: receiving a second route sent by the first network device, and refreshing the routing table by using the second route, where the second route is sent by the first network device after the first network device determines that sending of data in a data stream to which the second route belongs has been completed, and the second route is a route used to refresh any one of the first routes, or the second route is a route learned by the first network device after the first network device sends the plurality of first routes.

After receiving the second route, the second network device may directly use the second route to refresh the routing table without waiting for the end indication. This can ensure that a service flow related to the second route can be normally forwarded.

Optionally, before receiving the plurality of first routes sent by the first network device in the parallel transmission manner, the method may further include: after refreshing a route receiving policy for the first network device, sending a route refresh message to the first network device, where the route refresh message indicates the first network device to send the plurality of first routes. Correspondingly, a process of deleting a route other than the plurality of first routes from the routing table based on the first end indication may include: deleting a target route other than the plurality of first routes from the routing table based on the first end indication, where the target route is a route learned from the first network device before the route refresh message is sent.

In a scenario in which the second network device refreshes the route receiving policy, after refreshing the routing table by using the plurality of first routes, the second network device may age, from the routing table based on the end indication, the target route learned from the first network device, and does not need to age a route learned from another neighboring network device, to avoid affecting normal forwarding of a service flow related to another route.

Optionally, the method may further include: after disconnecting from a plurality of neighboring network devices and restarting a routing protocol, re-establishing connections to the plurality of neighboring network devices, where the plurality of neighboring network devices include the first network device and a third network device; and receiving a plurality of third routes sent by the third network device in the parallel transmission manner, and receiving a second end indication sent by the third network device, where the second end indication is sent by the third network device after the third network device determines that the second network device has received the plurality of third routes. Correspondingly, a process in which the second network device deletes a route other than the plurality of first routes from the routing table based on the first end indication after refreshing the routing table by using the plurality of first routes may include: after refreshing the routing table by using the plurality of first routes and the plurality of third routes, deleting a route other than the plurality of first routes and the plurality of third routes from the routing table based on the first end indication and the second end indication.

In a scenario in which the second network device restarts a routing protocol thereof, because the second network device is first disconnected from a plurality of neighboring network devices of the second network device, and then re-establishes connections, the plurality of neighboring network devices each need to re-advertise a route. Correspondingly, in this scenario, after receiving end indications sent by the plurality of neighboring network devices, the second network device may age a route that is not refreshed in the routing table of the second network device.

Optionally, the routes sent by the first network device and the routes sent by the third network device may all belong to a target address family. In this case, a process in which the second network device deletes the route other than the plurality of first routes from the routing table based on the first end indication and the second end indication may include: deleting, from the routing table based on the first end indication and the second end indication, a route that belongs to the target address family and that is other than the plurality of first routes and the plurality of third routes.

The second network device ages the routing table based on an address family, so that refresh efficiency of the routing table can be effectively improved on the premise of ensuring that the route that is not refreshed in the routing table is reliably aged.

According to still another aspect, a first network device is provided. The first network device may include at least one module, and the at least one module may be configured to implement the route refresh method that is provided in the foregoing aspects and that is applied to the first network device.

According to yet another aspect, a second network device is provided. The second network device may include at least one module, and the at least one module may be configured to implement the route refresh method that is provided in the foregoing aspects and that is applied to the second network device.

According to yet another aspect, a network device is provided. The network device may include a memory, a processor, and a computer program that is stored in the memory and that can run on the processor. When executing the computer program, the processor performs the route refresh method provided in any one of the foregoing aspects.

According to yet another aspect, a network device is provided. The network device may include a main control board and an interface board. The interface board may be configured to implement the route refresh method that is provided in the foregoing aspects and that is applied to the first network device, or may be configured to implement the route refresh method that is provided in the foregoing aspects and that is applied to the second network device.

According to yet another aspect, a network device is provided. The network device may be a first network device in a route refresh system, and the network device includes a main control board and an interface board. The main control board includes: a first processor and a first memory. The interface board includes: a second processor, a second memory, and an interface card. The main control board and the interface board are coupled.

The second memory may be configured to store program code. The second processor is configured to invoke the program code in the second memory to trigger the interface card to perform the following operations: sending a plurality of first routes to a second network device in a parallel transmission manner; and after determining that the second network device receives the plurality of first routes, sending an end indication to the second network device, where the plurality of first routes are used by the second network device to refresh a routing table, and the end indication indicates that the sending of the plurality of first routes has been completed.

According to yet another aspect, a network device is provided. The network device may be a second network device in a route refresh system, and the network device includes a main control board and an interface board. The main control board includes: a first processor and a first memory. The interface board includes: a second processor, a second memory, and an interface card. The main control board and the interface board are coupled.

The second memory may be configured to store program code. The second processor is configured to invoke the program code in the second memory to trigger the interface card to perform the following operations: receiving a plurality of first routes sent by a first network device in a parallel transmission manner, and receiving a first end indication sent by the first network device.

The first memory may be configured to store program code. The first processor is configured to invoke the program code in the first memory, to trigger the interface card to perform the following operation: after refreshing a routing table by using the plurality of first routes, deleting a route other than the plurality of first routes from the routing table based on the first end indication, where the first end indication is sent by the first network device after the first network device determines that the second network device has received the plurality of first routes.

According to yet another aspect, a computer-readable storage medium is provided. The computer-readable storage medium stores instructions, and the instructions are executed by a processor to implement the route refresh method provided in any one of the foregoing aspects.

According to yet another aspect, a computer program product including instructions is provided. When the computer program product runs on a computer, the computer is enabled to perform the route refresh method provided in any one of the foregoing aspects.

According to yet another aspect, a route refresh system is provided. The system may include the first network device provided in the foregoing aspects and the second network device provided in the foregoing aspects.

In conclusion, the present disclosure provides the route refresh method, device, and system. In the solutions provided in the present disclosure, the first network device can send the plurality of first routes to the second network device in the parallel transmission manner, and may send the end indication after determining that the second network device receives the plurality of first routes. Therefore, it can be ensured that in the parallel transmission scenario, the end indication does not reach the second network device earlier than the first route. This can avoid a problem that a service flow is interrupted because the second network device untimely ages a route that is not refreshed in a routing table.

In addition, after refreshing the routing table by using the plurality of first routes, the second network device may age, based on the first end indication, the route that is not refreshed in the routing table. This can further avoid the problem that the service flow is interrupted because the end indication is untimely processed.

DESCRIPTION OF EMBODIMENTS

The following describes in detail a route refresh method, apparatus, and system provided in embodiments of the present disclosure with reference to the accompanying drawings.

Figure 1:
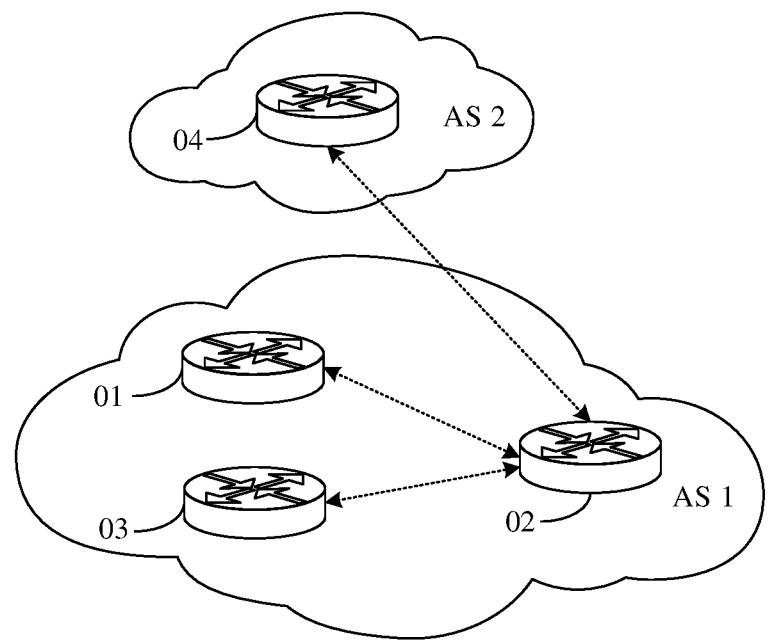
FIG. 1 is a schematic diagram of a structure of a communication system to which a route refresh method is applied according to an embodiment of the present disclosure.

FIG. 1 is a schematic diagram of a structure of a communication system to which a route refresh method is applied according to an embodiment of the present disclosure. As shown in FIG. 1, the system includes a plurality of network devices. The plurality of network devices may belong to different ASs, or may belong to a same AS. For example, four network devices are shown in FIG. 1. A network device 01, a network device 02, and a network device 03 belong to an AS 1, and a network device 04 belongs to an AS 2. It may be understood that each network device in the system may be a device with a data forwarding function, such as a router or a switch.

In this embodiment of the present disclosure, network devices in a same AS are connected to each other, and may run a same interior gateway protocol (IGP). The IGP may be an intermediate system to intermediate system (ISIS) protocol, or an open shortest path first (OSPF) protocol. Network devices in different ASs may be connected according to an external routing protocol. Certainly, the network devices in the same AS may also be connected according to the external routing protocol. The external routing protocol may be a BGP, and routes of the network devices in different ASs is reachable according to the BGP. In the communication system, a pair of network devices in a BGP connection relationship may be peers of each other, or may be referred to as neighbors. In addition, a pair of network devices that are in the same AS and have a BGP connection relationship may be internal BGP (IBGP) peers of each other, and a pair of network devices that belong to different ASs and have a BGP connection relationship may be external BGP (EBGP) peers of each other.

The BGP uses the following four types of messages:
1. Open message: The open message is the first message sent after a transmission control protocol (TCP) connection is established between network devices. The open message is used to establish a connection relationship between BGP peers.
2. Keepalive message: A network device periodically sends a keepalive message to a peer of the network device to maintain validity of the connection.
3. Update message: An update message is used to exchange routing information between peers. The update message can be used to advertise reachable route information or withdraw unreachable route information.
4. Notification message: When detecting an error, a network device sends a notification message to the peer. Then, a BGP connection is interrupted immediately.

In a possible scenario, when performing a graceful restart (for example, restarting the BGP), to ensure normal forwarding of a service flow, the network device in the system does not clear a forwarding entry of a forwarding plane of the network device. After the graceful restart is complete, the network device needs the peer of the network device to re-advertise a BGP route (for example, advertise a preferred BGP route), so that the network device can synchronize a changed route during the graceful restart. After advertising all BGP routes, the peer needs to send a routing information base (RIB) end (end of RIB, EOR) message to the network device. The network device may refresh a routing table thereof based on the received BGP route, and then refresh the forwarding entry of the forwarding plane based on the refreshed routing table. In addition, after receiving the EOR message, the network device may delete, from the routing table, another route other than the BGP route that is re-advertised by the peer of the network device and that is received before an end indication, in other words, the network device may age a to-be-refresh route in the routing table.

For example, it is assumed that the routing table of the network device includes four BGP routes learned from the peer of the network device, and address prefixes of the four BGP routes are respectively 1.1.1.1, 2.2.2.2, 3.3.3.3, and 4.4.4.4. After the graceful restart, the network device receives three BGP routes advertised by the peer of the network device, where the address prefixes of the three BGP routes are respectively 1.1.1.1, 2.2.2.2, and 3.3.3.3. In this case, the network device may refresh the BGP routes with the address prefixes 1.1.1.1, 2.2.2.2, and 3.3.3.3 in the routing table, and may delete the BGP route with the address prefix 4.4.4.4 from the routing table after receiving the EOR message sent by the peer of the network device.

In another possible scenario, after a network device in the system modifies a route receiving policy of the network device for a peer, the network device sends a route refresh message to the peer. The peer that receives the route refresh message re-advertises a BGP route to the network device, and after all BGP routes are advertised, the peer needs to send an end of route refresh (EORR) message to the network device. The network device may refresh a routing table based on the received BGP route, and then refresh a forwarding entry of a forwarding plane based on the refreshed routing table. In addition, after receiving the EORR message, the network device may age, among the routes learned from the peer and included in the routing table, a route (that is, a route that is not refreshed) other than the BGP route received between the route refresh message and the EORR message.

For related descriptions of the graceful restart and the EOR message, refer to a request for comments (RFC) file numbered 4724. For details about the EORR, refer to an RFC file numbered 7313.

In this embodiment of the present disclosure, a plurality of paths may be included between two network devices that establish a BGP connection, and the plurality of paths may transmit a BGP route in a parallel transmission manner. Correspondingly, in the foregoing two possible scenarios, after sending a to-be-advertised BGP route through the plurality of paths, the peer may send the EOR message or the EORR message through one of the paths.

However, if a path used to transmit a BGP route is congested, the EOR message or the EORR message may reach the network device earlier than the BGP route. When aging, based on the end indication, a route that is not refreshed in the routing table, the network device deletes the BGP route that is not received, resulting in interruption of a service flow.

Figure 2:
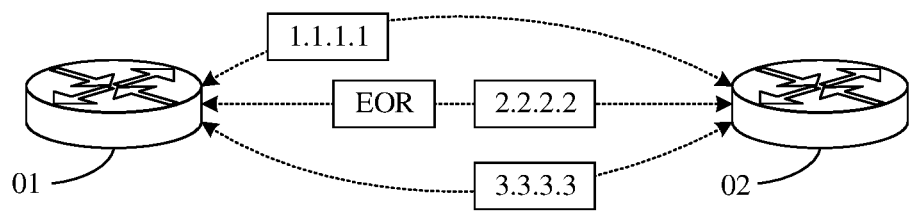
FIG. 2 is a schematic diagram of an end indication arriving at a second network device earlier than a to-be-advertised route.

For example, refer to FIG. 2. It is assumed that after the network device 02 performs a graceful restart, the network device 01 transmits, in a multi-path parallel manner, BGP routes whose address prefixes are respectively 1.1.1.1, 2.2.2.2, and 3.3.3.3 to the second network device 02. In addition, after sending the three BGP routes, the network device 01 transmits the EOR message through a path used to transmit the BGP route whose address prefix is 2.2.2.2. If a path used to transmit the BGP route whose address prefix is 1.1.1.1 is congested or a transmission rate is relatively low, the EOR message reaches the network device 02 earlier than the BGP route whose address prefix is 1.1.1.1. Correspondingly, after receiving the EOR message, the network device 02 may refresh the BGP routes whose address prefixes are 2.2.2.2 and 3.3.3.3 in the routing table, and may delete, after receiving the EOR message, the BGP routes whose address prefixes are 1.1.1.1 and 4.4.4.4. In addition, only after subsequently receiving the BGP route whose address prefix is 1.1.1.1, the network device 02 refreshes the BGP route whose address prefix is 1.1.1.1 in the routing table again. As a result, a service flow whose destination address is 1.1.1.1 is interrupted for a period of time.

Figure 3:
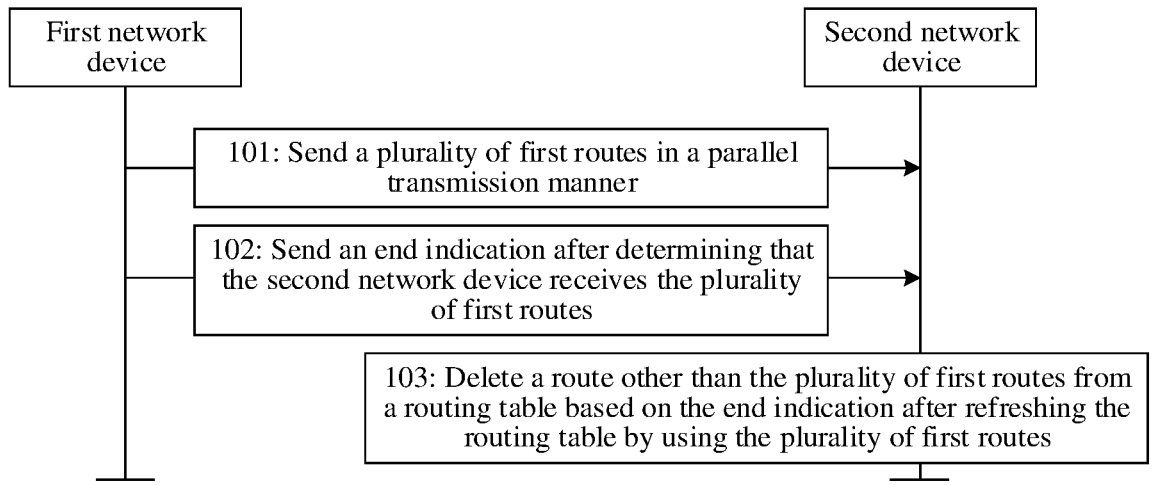
FIG. 3 is a flowchart of a route refresh method according to an embodiment of the present disclosure.

An embodiment of the present disclosure provides a route refresh method. In the method, it can be ensured that in a parallel transmission scenario, for example, an end indication of an EOR message and an end indication of an EORR message can reach a network device later than a to-be-advertised route. This can avoid a problem that a service flow is interrupted because the network device untimely ages a route that is not refreshed in a routing table. The route refresh method may be applied to the system shown in FIG. 1 or FIG. 2. The system may include at least a first network device and a second network device. The two network devices may belong to a same AS, or may belong to different ASs. In addition, a connection is established between the two network devices according to an external routing protocol. Refer to FIG. 3. The route refresh method provided in this embodiment of the present disclosure may include the following steps.

Step 101: The first network device sends a plurality of first routes to the second network device in a parallel transmission manner.

In this embodiment of the present disclosure, if determining that the first network device needs to re-advertise a local route of the first network device to the second network device, the first network device may send the plurality of first routes to the second network device in a parallel transmission manner, where the plurality of first routes are used by the second network device to refresh a routing table of the second network device. The plurality of first routes are to-be-advertised routes in the first network device, for example, may be preferred routes in the first network device. In addition, the plurality of first routes may also be referred to as reconciliation routes.

Optionally, a plurality of paths may be established between the first network device and the second network device, and the first network device may transmit the plurality of first routes in parallel through the plurality of paths. Alternatively, one path may be established between the first network device and the second network device, and the first network device may transmit a plurality of data streams in a parallel transmission manner through the one path. Each data stream includes at least one first route, so that the plurality of first routes is transmitted in parallel.

Step 102: After determining that the second network device receives the plurality of first routes, the first network device sends an end indication to the second network device.

After sending the plurality of first routes, the first network device may determine, based on an acknowledgment message fed back by the second network device, whether the second network device receives the plurality of first routes. If determining that the second network device receives the plurality of first routes, the first network device may send the end indication to the second network device, where the end indication indicates that the sending of the plurality of first routes has been completed.

Step 103: After refreshing the routing table by using the plurality of first routes, the second network device deletes a route other than the plurality of first routes from the routing table based on the end indication.

After receiving the first routes sent by the first network device, the second network device may refresh the routing table of the second network device by using the first routes. In addition, after receiving the end indication sent by the first network device, the second network device may determine that the first network device has completed sending the to-be-advertised first routes. Therefore, if determining that the routing table is refreshed by using the plurality of first routes, the second network device may delete the route other than the plurality of first routes from the routing table based on the end indication, that is, ages the route that is not refreshed in the routing table.

It may be understood that if the second network device can process the received first routes and the received end indication in parallel, some unprocessed first routes may be deleted inadvertently because the end indication is untimely processed. However, in this embodiment of the present disclosure, because the second network device may process the end indication after processing the plurality of first routes, a problem that some routes are deleted inadvertently because the end indication is untimely processed can be effectively avoided.

In conclusion, this embodiment of the present disclosure provides the route refresh method. The first network device can send the plurality of first routes to the second network device in the parallel transmission manner, and may send the end indication after determining that the second network device receives the plurality of first routes. Therefore, it can be ensured that in the parallel transmission scenario, the end indication does not reach the second network device earlier than the first route. This can avoid a problem that a service flow is interrupted because the second network device untimely ages, based on the end indication, a route that is not refreshed in a routing table.

In addition, after refreshing the routing table by using the plurality of first routes, the second network device may age, based on the first end indication, the route that is not refreshed in the routing table. This can further avoid the problem that the service flow is interrupted because the end indication is untimely processed.

Figure 4:
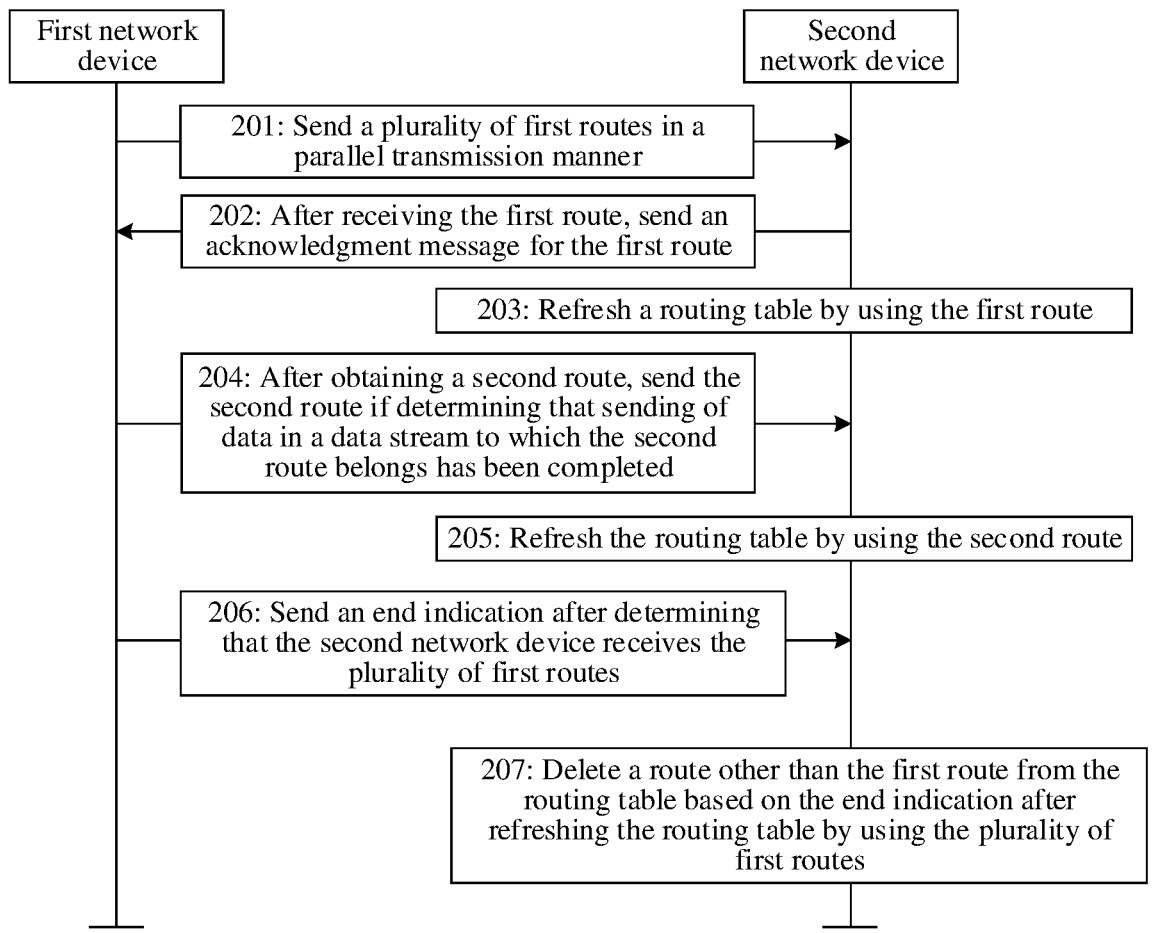
FIG. 4 is a flowchart of another route refresh method according to an embodiment of the present disclosure.

FIG. 4 is a flowchart of another route refresh method according to an embodiment of the present disclosure. The method may be applied to the system shown in FIG. 1 or FIG. 2. The system may include at least a first network device and a second network device. The two network devices may belong to a same AS, or may belong to different ASs. A connection is established between the two network devices according to an external routing protocol (for example, a BGP). Refer to FIG. 4. The route refresh method provided in this embodiment of the present disclosure may include the following steps.

Step 201: The first network device sends a plurality of first routes to the second network device in a parallel transmission manner.

In this embodiment of the present disclosure, if determining that the first network device needs to re-advertise a local route of the first network device to the second network device, the first network device may send the plurality of first routes to the second network device in a parallel transmission manner. The plurality of first routes are to-be-advertised routes in the first network device, for example, may be preferred routes in the first network device.

In a scenario in which the external routing protocol is the BGP, the first network device may advertise the first routes to the second network device via an update message (which may also be referred to as an update packet). Each first route may be carried in one update message, and one update message may carry one or more first routes.

In a possible example, a plurality of paths may be established between the first network device and the second network device, and the first network device may transmit the plurality of first routes in parallel through the plurality of paths. The plurality of paths may be established according to a QUIC protocol. Alternatively, the plurality of paths may be established according to a TCP (or a UDP), in other words, a plurality of TCP (or UDP) connections may be established between the first network device and the second network device. Alternatively, the plurality of paths may be established according to the BGP, in other words, a plurality of BGP connections may be established between the first network device and the second network device.

It may be understood that, in this example, each path between the first network device and the second network device may transmit one data stream, or may transmit a plurality of data streams in parallel. This is not limited in this embodiment of the present disclosure.

In another possible example, one path may be established between the first network device and the second network device, and the first network device may transmit a plurality of data streams in parallel through the one path. Each data stream includes at least one first route, so that the plurality of first routes are transmitted in parallel.

Figure 5:
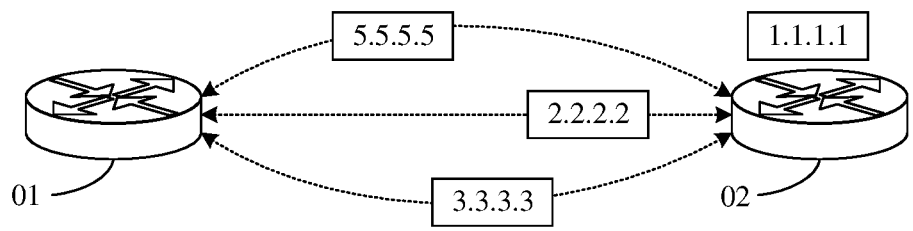
FIG. 5 is a schematic diagram of sending a second route by a first network device according to an embodiment of the present disclosure.

For example, refer to FIG. 5. It is assumed that three paths are established between a first network device 01 and a second network device 02 according to the QUIC protocol. If address prefixes of three to-be-advertised preferred routes (that is, the first routes) in the first network device 01 are respectively 1.1.1.1, 2.2.2.2, and 3.3.3.3, the first network device 01 may transmit the three preferred routes in parallel through the three paths.

In a possible scenario, the second network device may send a route refresh message to the first network device after refreshing a route receiving policy for the first network device. The first network device may send the plurality of first routes to the second network device in the parallel transmission manner based on an indication of the route refresh message.

In another possible scenario, after the second network device performs a graceful restart to restart a routing protocol, the first network device may send the plurality of first routes to the second network device in the parallel transmission manner. It may be understood that the second network device is disconnected from each neighboring network device (including the first network device) before the graceful restart, and may re-establish a connection to each neighboring network device after the graceful restart. Therefore, after detecting that the first network device is disconnected from the second network device and re-establishes the connection to the second network device, the first network device may determine that the second network device has completed the graceful restart, and may send the plurality of first routes to the second network device in the parallel transmission manner.

Step 202: After receiving the first route, the second network device sends an acknowledgment message for the first route to the first network device.

In this embodiment of the present disclosure, after receiving the first route sent by the first network device, the second network device may send the acknowledgment message for the first route to the first network device, so that the first network device determines that the second network device has received the first route.

Optionally, after receiving one or more packets (for example, an update packet) sent by the first network device, the second network device may feed back one acknowledgment message to the first network device. The acknowledgment message indicates that the second network device has received the one or more packets. Each packet may carry one or more first routes.

It may be understood that a connection is established between the first network device and the second network device according to an external routing protocol such as the BGP, and a transport layer protocol used by the external routing protocol may be a TCP, a QUIC protocol, a UDP, or the like. After receiving, based on the TCP, the QUIC protocol, or the UDP, data transmitted by the first network device, the second network device may feed back an acknowledgment (ACK) message to the first network device.

Step 203: The second network device refreshes a routing table by using the first route.

After receiving each first route sent by the first network device, the second network device may refresh the routing table by using the first route.

For example, refer to FIG. 5. It is assumed that the second network device 02 receives a first route that is sent by the first network device 01 and whose address prefix is 1.1.1.1, the second network device 02 may refresh the route whose address prefix is 1.1.1.1 in the routing table of the second network device 02.

Step 204: After obtaining a second route, the first network device sends the second route to the second network device if determining that sending of data in a data stream to which the second route belongs has been completed.

In a process of transmitting the plurality of first routes, if obtaining the second route, the first network device may first determine the data stream to which the second route belongs. If determining that the data in the data stream to which the second route belongs is sent completed, the first network device may directly send the second route to the second network device, for example, may notify the second route via the update message. The second route may be a route used to refresh (for example, withdraw or change an attribute) any one of the first routes, or the second route may be a new route learned by the first network device after the first network device sends the plurality of first routes.

For example, refer to FIG. 5. It is assumed that after sending the first routes whose address prefixes are respectively 1.1.1.1, 2.2.2.2, and 3.3.3.3, the first network device 01 learns of a second route whose address prefix is 5.5.5.5, and a data stream to which the second route belongs is the same as a data stream to which the first route whose address prefix is 1.1.1.1 belongs. In this case, after determining that the sending of the data in the data stream to which the second route belongs has been completed, the first network device 01 may send the second route whose address prefix is 5.5.5.5 to the second network device 02 through the path used to transmit the first route whose address prefix is 1.1.1.1.

In this embodiment of the present disclosure, after obtaining the second route and determining that the sending of the data in the data stream to which the second route belongs has been completed, the first network device may directly send the second route without waiting for sending of the end indication. Therefore, it can be ensured that the second network device can refresh the routing table in time by using the second route, to ensure that a service flow related to the second route can be normally forwarded.

For example, as shown in FIG. 5, when the first network device 01 determines that the sending of the data in the data stream to which the second route whose address prefix is 5.5.5.5 belongs has been completed, if the first routes whose address prefixes are 2.2.2.2 and 3.3.3.3 does not reach the second network device 02, the first network device 01 may directly send the second route whose address prefix is 5.5.5.5, without waiting for completion of transmission of the two first routes.

Step 205: The second network device refreshes the routing table by using the second route.

In a process of receiving the first route transmitted by the first network device, if the second network device receives the second route sent by the first network device, the second network device may directly refresh, based on the second route, the routing table without waiting for the end indication sent by the first network device.

For example, refer to FIG. 5. It is assumed that after receiving the first route whose address prefix is 1.1.1.1, the second network device 02 receives the second route whose address prefix is 5.5.5.5. In this case, the second network device 02 may directly refresh the route whose address prefix is 5.5.5.5 in the routing table.

Step 206: After determining that the second network device receives the plurality of first routes, the first network device sends the end indication to the second network device.

After sending the plurality of first routes, the first network device may determine, based on the acknowledgment message fed back by the second network device, whether the second network device receives the plurality of first routes. If determining that the second network device has received the plurality of first routes, the first network device may send the end indication to the second network device. The end indication indicates that the sending of the plurality of first routes has been completed.

Figure 6:
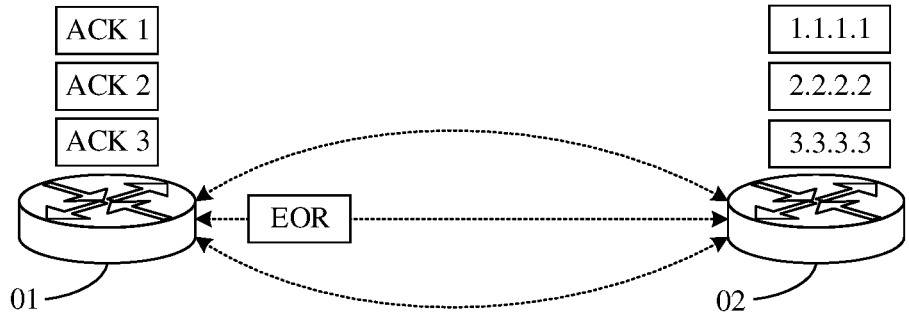
FIG. 6 is a schematic diagram of sending an end indication by a first network device according to an embodiment of the present disclosure.

For example, refer to FIG. 5 and FIG. 6. It is assumed that address prefixes of three first routes to be advertised by the first network device 01 are respectively 1.1.1.1, 2.2.2.2, and 3.3.3.3, and the three first routes are respectively sent to the second network device 02 via a first packet, a second packet, and a third packet. As shown in FIG. 6, the first network device 01 may send the end indication to the second network device 02 after receiving an acknowledgment message ACK 1 for the first packet, an acknowledgment message ACK 2 for the second packet, and an acknowledgment message ACK 3 for the third packet that are sent by the second network device 02. For example, if the connection between the first network device and the second network device is established according to the BGP, the end indication may be an EOR message or an EORR message. If the connection between the two network devices is established according to another routing protocol other than the BGP, the end indication may be a similar message defined in the another routing protocol.

It may be understood that in a scenario in which the second network device modifies the route receiving policy for the first network device, and sends the route refresh message to the first network device, the end indication may be the EORR message. In a scenario in which the second network device performs the graceful start, the end indication may be the EOR message.

Optionally, the first network device may include a routing module and a transmission module. The routing module runs a routing protocol, and the transmission module runs a transmission protocol. The routing protocol may be the BGP, and the transmission protocol may be the TCP, the UDP, the QUIC protocol, or the like.

In a possible example, after determining that the plurality of first routes need to be advertised to the second network device, the routing module may first send the plurality of first routes and the end indication to the transmission module, and may configure a transmission tag for the transmission module. The transmission tag may indicate the transmission module to send the end indication to the second network device after determining that the second network device receives the plurality of first routes.

Correspondingly, the transmission module may send the plurality of first routes to the second network device in the parallel transmission manner based on the indication of the transmission tag, and may send the end indication to the second network device after determining that the second network device receives the plurality of first routes.

It can be learned from the foregoing descriptions that the routing module only needs to transmit the plurality of to-be-advertised first routes and the end indication to the transmission module, and configure the transmission tag for the transmission module, without controlling a sending time sequence of the first routes and the end indication. In other words, in this example, the transmission module may control the sending time sequence of the end indication based on the transmission tag, to implement sequential transmission of the first route and the end indication.

It may be understood that the transmission module may provide a function interface, and the routing module may transmit a packet that carries a route or the end indication to the transmission module by invoking the function interface. The function interface has a plurality of interface parameters, and the plurality of interface parameters may include a packet pointer, a related mark, and the like. The routing module may configure the transmission tag in an interface parameter of the function interface when invoking the function interface to transmit the packet that carries the end indication to the transmission module.

It may be further understood that in this example, if obtaining the second route, the routing module may directly send the second route to the transmission module. If determining that the sending of the data in the data stream to which the second route belongs has been completed, the transmission module may send the second route.

In another possible example, after determining that the plurality of first routes need to be advertised to the second network device, the routing module may first send the plurality of first routes to the transmission module. The transmission module may further send the plurality of first routes to the second network device in the parallel transmission manner, and the transmission module may receive the acknowledgment message sent by the second network device for the first route. Then, after determining, based on a notification message provided by the transmission module, that the second network device has received the plurality of first routes, the routing module may send the end indication to the transmission module, and the transmission module further sends the end indication to the second network device.

It can be learned from the foregoing descriptions that the transmission module only needs to send, to the second network device, the packet (including the first route and the end indication) transmitted by the routing module, and provides the notification message, without controlling the sending time sequence of the end indication. In other words, in this example, the routing module may control the sending time sequence of the end indication based on the obtained notification message.

It may be understood that in this example, the transmission module may actively send the notification message to the routing module. Alternatively, the transmission module may provide a message interface, and the routing module may obtain the notification message by querying the message interface. The notification message may indicate whether the second network device has received the plurality of first routes.

It may be further understood that in this example, if obtaining the second route, the routing module may first determine whether the sending of data in the data stream to which the second route belongs has been completed. For example, the routing module may determine, based on the obtained notification message, whether the sending of the data in the data stream to which the second route belongs has been completed. If determining that the sending of the data in the data stream to which the second route belongs has been completed, the routing module may send the second route to the transmission module, and the transmission module may further send the second route to the second network device.

Step 207: After refreshing the routing table by using the plurality of first routes, the second network device deletes a route other than the first route from the routing table based on the end indication.

After receiving the end indication sent by the first network device, the second network device may determine that the first network device has completed sending the plurality of to-be-advertised first routes. Correspondingly, if determining that the routing table is refreshed by using the plurality of first routes, the second network device may delete the route other than the first route from the routing table based on the end indication. In other words, after determining that the plurality of first routes have been processed, the second network device may age, based on the end indication, a route that is not refreshed in the routing table.

It may be understood that the second network device may include a plurality of processors, and the plurality of processors may process the route and the end indication in parallel. In a parallel processing scenario, the second network device does not need to specify a processing sequence of the plurality of first routes, but needs to ensure that the end indication is processed after all the plurality of first routes are processed.

According to one aspect, in the scenario in which the second network device modifies the route receiving policy for the first network device, when aging, based on the end indication, the route that is not refreshed in the routing table, the second network device may age only a target route other than the plurality of first routes in the routing table. The target route is a route learned from the first network device before the route refresh message is sent. In other words, in this scenario, the second network device may age only a route that is not refreshed and that is learned from the first network device. If a route that is not refreshed in the routing table is learned from another neighboring network device, the second network device does not need to age the route either.

For example, it is assumed that before the second network device modifies the route receiving policy for the first network device, the routing table of the second network device includes four routes learned from the first network device. Address prefixes of the four routes are respectively 1.1.1.1, 2.2.2.2, 3.3.3.3, and 4.4.4.4, and the routing table further includes a route that is learned from another neighboring network device and whose address prefix is 6.6.6.6. If the second network device receives three first routes from the first network device in a time period from sending the route refresh message to receiving the end indication, address prefixes of the three first routes are respectively 1.1.1.1, 2.2.2.2, and 3.3.3.3. In this case, the second network device may refresh the routes whose address prefixes are 1.1.1.1, 2.2.2.2, and 3.3.3.3 in the routing table, and may delete, after receiving the end indication, the route whose address prefix is 4.4.4.4, and does not need to delete the route whose address prefix is 6.6.6.6.

According to another aspect, in the scenario in which the second network device performs the graceful restart, the second network device needs to first be disconnected from a plurality of neighboring network devices, then restart a routing protocol of the second network device, and after the routing protocol is restarted, re-establish connections to the plurality of neighboring network devices. It may be understood that the plurality of neighboring network devices may include the first network device, and may further include a third network device other than the first network device.

In this scenario, the third network device may also perform the method shown in step 101 and step 102 (or step 201 and step 206) after detecting that the third network device is disconnected from the second network device and re-establishes the connection to the second network device. Correspondingly, the second network device may further receive a plurality of third routes sent by the third network device in the parallel transmission manner, and receive an end indication sent by the third network device. For ease of distinguishing, the end indication sent by the first network device is referred to as a first end indication below, and the end indication sent by the third network device is referred to as a second end indication below. The second end indication is sent by the third network device after the third network device determines that the second network device has received the plurality of third routes. Correspondingly, after refreshing the routing table by using the plurality of first routes and the plurality of third routes, the second network device may delete a route other than the plurality of first routes and the plurality of third routes from the routing table based on the first end indication and the second end indication.

In a possible example of this scenario, after receiving end indications sent by all neighboring network devices (including the first network device and the third network device), the second network device may age in the routing table, a route other than routes re-advertised by all the neighboring network devices, that is, age a route that is not refreshed in the routing table.

In another possible example of this scenario, because routes advertised by different neighboring network devices may belong to different address families, the second network device can further age the routing table based on an address family. In other words, after receiving the end indication that is sent by each neighboring network device and that is used to advertise a route of an address family, the second network device may age a route that is not refreshed and that belongs to the address family and is in the routing table, and does not need to age a route of another address family in the routing table. Correspondingly, the second network device does not need to wait for the end indication sent by another neighboring network device.

Based on the foregoing manner, refresh efficiency of the routing table can be effectively improved on the premise of ensuring that the route that is not refreshed in the routing table is reliably aged.

Figure 7:
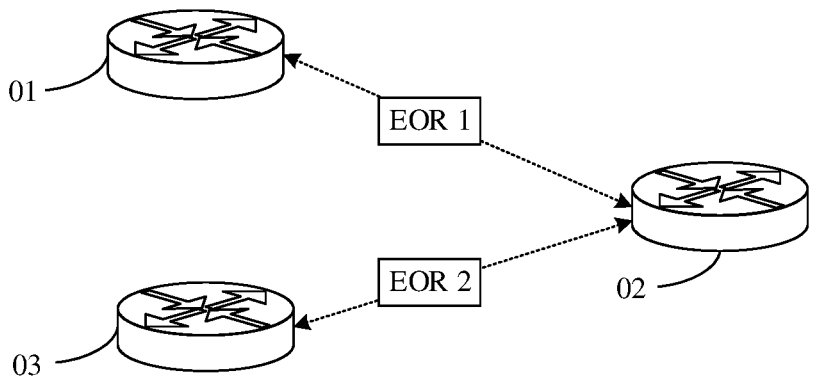
FIG. 7 is a schematic diagram of sending an end indication by a first network device and a third network device according to an embodiment of the present disclosure.

It is assumed that in each neighboring network device of the second network device, the routes sent by the first network device and the routes sent by the third network device all belong to a target address family. As shown in FIG. 7, after receiving the first end indication (for example, an EOR 1) sent by a first network device 01 and the second end indication (for example, an EOR 2) sent by a third network device 03, a second network device 02 may delete, from the routing table, a route that belongs to the target address family and that is other than the plurality of first routes and the plurality of third routes.

The address family to which the route in the routing table belongs may include at least one of the following address families: an Internet protocol version 4 (IPv4) address family, an Internet protocol version 6 (IPv6) address family, a virtual private network (VPN) address family, and the like.

It may be understood that in a scenario in which the second network device has refreshed, before receiving the end indication, the routing table by using the second route and when aging the routing table based on the end indication, the second network device may ignore the second route, in other words, the second route does not need to be aged. For example, the second network device may determine, based on a case that a timestamp of the second route is later than a timestamp of each first route, and/or based on a case that a sequence number of the second route is greater than a sequence number of each first route, that the second route does not need to be aged. Certainly, the second network device may alternatively determine, in another manner, that the second route does not need to be aged. This is not limited in this embodiment of the present disclosure.

It may be further understood that after refreshing the routing table based on the first route or the second route, and after aging, based on the end indication, the route that is not refreshed in the routing table, the second network device may refresh a forwarding entry of a forwarding plane of the second network device based on the changed routing table.

It may be understood that sequences of the steps of the route refresh method provided in this embodiment of the present disclosure may be appropriately adjusted, or steps may be correspondingly added or deleted as required. For example, step 204 and step 205 may be deleted as required.

Alternatively, step 204 and step 205 may be performed before step 203. Alternatively, step 203 may be performed before step 202.

In conclusion, this embodiment of the present disclosure provides the route refresh method. The first network device can send the plurality of first routes to the second network device in the parallel transmission manner, and may send the end indication after determining that the second network device receives the plurality of first routes. Therefore, it can be ensured that in a parallel transmission scenario, the end indication does not reach the second network device earlier than the first route. This can avoid a problem that a service flow is interrupted because the second network device untimely ages a route that is not refreshed in a routing table.

In addition, after refreshing the routing table by using the plurality of first routes, the second network device may age, based on the first end indication, a route that is not refreshed in the routing table. This can further avoid a problem that a service flow is interrupted because the end indication is untimely processed.

Figure 8:
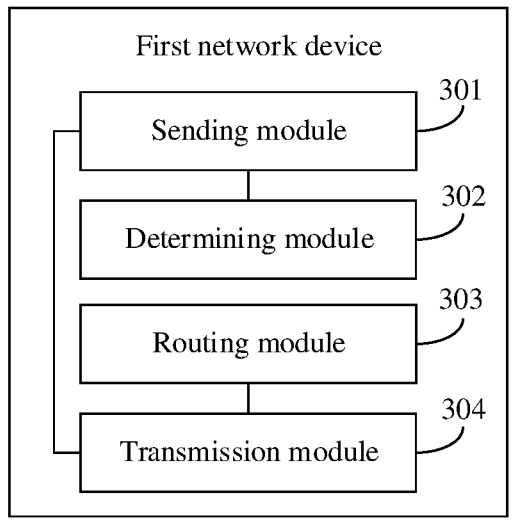
FIG. 8 is a schematic diagram of a structure of a first network device according to an embodiment of the present disclosure.

FIG. 8 is a schematic diagram of a structure of a first network device according to an embodiment of the present disclosure. The first network device may be used in a route refresh system, for example, may be used in the system shown in FIG. 1 and any one of the systems shown in FIG. 5 to FIG. 7. In addition, the first network device may implement the steps performed by the first network device in the embodiment shown in FIG. 3 or FIG. 4.

Refer to FIG. 8. The first network device includes: a sending module 301, configured to send a plurality of first routes to a second network device in a parallel transmission manner, and send an end indication to the second network device after determining that the second network device has received the plurality of first routes, where the plurality of first routes are used by the second network device to refresh a routing table, and the end indication indicates that the sending of the plurality of first routes has been completed.

For a function implementation of the sending module 301, refer to related descriptions of step 101 and step 102, or step 201 and step 206 in the foregoing method embodiments.

Optionally, still refer to FIG. 8. The first network device may further include:
a determining module 302, configured to determine, based on an acknowledgment message sent by the second network device for the first route, that the second network device receives the plurality of first routes.

Optionally, as shown in FIG. 8, the first network device may further include a routing module 303 and a transmission module 304. The routing module 303 runs a routing protocol, and the transmission module 304 runs a transmission protocol.

In a possible implementation, the routing module 303 may be configured to: send the plurality of first routes and the end indication to the transmission module 304, and configure a transmission tag for the transmission module 304, where the transmission tag indicates the transmission module 304 to send, after determining that the second network device receives the plurality of first routes, the end indication to the second network device.

In another possible implementation, the routing module 303 may be configured to send the plurality of first routes to the transmission module 304, and send the end indication to the transmission module 304 after determining, based on a notification message provided by the transmission module 304, that the second network device receives the plurality of first routes.

Optionally, the sending module 301 may be further configured to: before sending the end indication to the second network device, send the second route to the second network device if determining that sending of data in a data stream to which a second route belongs has been completed, where the second route is a route used to refresh any one of the first routes, or the second route is a route learned by the first network device after the first network device sends the plurality of first routes.

For the function implementation of the sending module 301, further refer to related descriptions of step 204 in the foregoing method embodiment.

Optionally, the sending module 301 may be configured to: send, the plurality of first routes to the second network device in the parallel transmission manner based on a route refresh message sent by the second network device; or send the plurality of first routes to the second network device in the parallel transmission manner after disconnecting from the second network device and re-establishing a connection to the second network device.

Optionally, the sending module 301 may be configured to: send the plurality of first routes in parallel through a plurality of paths between the first network device and the second network device; or send a plurality of data streams in parallel through one path between the first network device and the second network device, where each data stream includes at least one first route.

Optionally, the plurality of paths between the first network device and the second network device may be established according to a QUIC protocol.

In conclusion, this embodiment of the present disclosure provides the first network device. The first network device can send the plurality of first routes to the second network device in the parallel transmission manner, and may send the end indication after determining that the second network device receives the plurality of first routes. Therefore, it can be ensured that in a parallel transmission scenario, the end indication does not reach the second network device earlier than the first route. This can avoid a problem that a service flow is interrupted because the second network device untimely ages a route that is not refreshed in a routing table.

Figure 9:
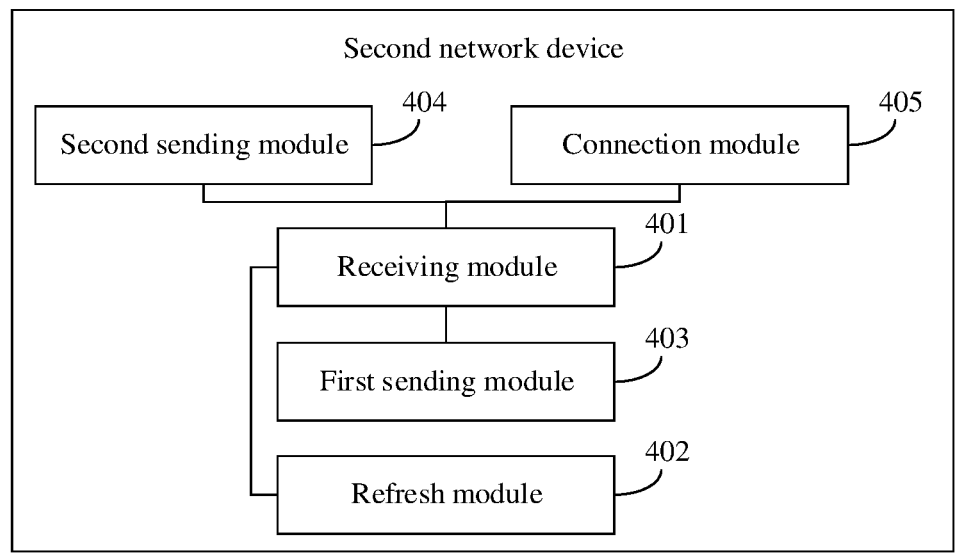
FIG. 9 is a schematic diagram of a structure of a second network device according to an embodiment of the present disclosure.

FIG. 9 is a schematic diagram of a structure of a second network device according to an embodiment of the present disclosure. The second network device may be used in a route refresh system, for example, may be used in the system shown in FIG. 1 and any one of the systems shown in FIG. 5 to FIG. 7. In addition, the second network device may implement the steps performed by the second network device in the embodiment shown in FIG. 3 or FIG. 4. Refer to FIG. 9. The second network device includes a receiving module 401 and a refresh module 402.

The receiving module 401 is configured to receive a plurality of first routes sent by a first network device in a parallel transmission manner, and receive a first end indication sent by the first network device, where the first end indication is sent by the first network device after the first network device determines that the second network device has received the plurality of first routes.

For a function implementation of the receiving module 401, refer to related descriptions of step 101 and step 102, or step 201 and step 206 in the foregoing method embodiments.

The refresh module 402 is configured to delete a route other than the plurality of first routes from a routing table based on the first end indication after refreshing the routing table by using the plurality of first routes. For a function implementation of the refresh module 402, refer to related descriptions of step 103 or step 207 in the foregoing method embodiments.

Optionally, as shown in FIG. 9, the second network device may further include:
a first sending module 403, configured to send an acknowledgment message for the first route to the first network device after receiving the first route.

For a function implementation of the first sending module 403, refer to related descriptions of step 202 in the foregoing method embodiment.

Optionally, the receiving module 401 may be further configured to receive, before receiving the end indication sent by the first network device, a second route sent by the first network device, where the second route is sent by the first network device after the first network device determines that sending of data in a data stream to which the second route belongs has been completed, and the second route is a route used to refresh any one of the first routes, or the second route is a route learned by the first network device after the first network device sends the plurality of first routes.

For a function implementation of the receiving module 401, further refer to related descriptions of step 204 in the foregoing method embodiment.

The refresh module 402 may be further configured to refresh the routing table by using the second route. For a function implementation of the refresh module 402, further refer to related descriptions of step 205 in the foregoing method embodiment.

Optionally, still refer to FIG. 9. The second network device may further include: a second sending module 404.

The second sending module 404 is configured to send a route refresh message to the first network device before the receiving module 401 receives the plurality of first routes and after a route receiving policy for the first network device is refreshed, where the route refresh message indicates the first network device to send the plurality of first routes.

For a function implementation of the second sending module 404, refer to related descriptions of step 201 in the foregoing method embodiment.

The refresh module 402 may be configured to delete a target route other than the plurality of first routes from the routing table based on the first end indication, where the target route is a route learned from the first network device before the route refresh message is sent.

Optionally, still refer to FIG. 9. The second network device may further include: a connection module 405.

The connection module 405 is configured to re-establish connections to a plurality of neighboring network devices after disconnecting from the plurality of neighboring network devices and restarting a routing protocol, where the plurality of neighboring network devices include the first network device and a third network device.

For a function implementation of the connection module 405, refer to related descriptions of step 201 in the foregoing method embodiment.

The receiving module 401 may be further configured to receive a plurality of third routes sent by the third network device in a parallel transmission manner, and receive a second end indication sent by the third network device, where the second end indication is sent by the third network device after the third network device determines that the second network device has received the plurality of third routes.

For a function implementation of the receiving module 401, further refer to related descriptions of step 207 in the foregoing method embodiment.

The refresh module 402 may be configured to delete a route other than the plurality of first routes and the plurality of third routes from the routing table based on the first end indication and the second end indication after refreshing the routing table by using the plurality of first routes and the plurality of third routes.

Optionally, the routes sent by the first network device and the routes sent by the third network device all belong to a target address family. The refresh module 402 may be configured to delete, from the routing table based on the first end indication and the second end indication, a route that belongs to the target address family and that is other than a plurality of first routes and a plurality of third routes.

In conclusion, this embodiment of the present disclosure provides the second network device. The second network device receives, only after receiving the plurality of first routes sent by the first network device, the end indication sent by the first network device, and the second network device may age, based on the first end indication, a route that is not refreshed in the routing table after refreshing the routing table by using the plurality of first routes. This can avoid a problem that some service flows are interrupted because some routes are inadvertently deleted by untimely processing the end indication.

It may be clearly understood by a person skilled in the art that, for the purpose of convenient and brief description, for detailed working processes of the first network device, the second network device, and each module described above, refer to corresponding processes in the foregoing method embodiments, and details are not described herein again.

It may be understood that the first network device and the second network device provided in embodiments of the present disclosure may alternatively be implemented by using an application-specific integrated circuit (ASIC) or a programmable logic device (PLD). The PLD may be a complex programmable logical device (CPLD), a field-programmable gate array (FPGA), a general array logic (GAL), or any combination thereof. Alternatively, the route refresh method provided in the foregoing method embodiments may be implemented by using software. When the route refresh method provided in the foregoing method embodiments is implemented by using software, the modules in the first network device and the second network device may also be software modules.

Figure 10:
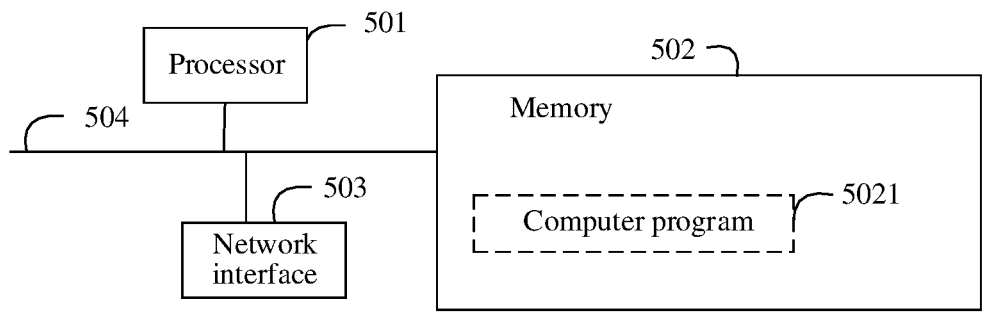
FIG. 10 is a schematic diagram of a structure of a network device according to an embodiment of the present disclosure.

FIG. 10 is a schematic diagram of a structure of a network device according to an embodiment of the present disclosure. The network device may be used in the system shown in FIG. 1 and any one of the systems shown in FIG. 5 to FIG. 7, and may be any one of the network devices in the system shown in the foregoing accompanying drawings. In addition, the network device may implement the steps performed by the first network device or the second network device in the foregoing method embodiments. As shown in FIG. 10, the network device may include a processor 501, a memory 502, a network interface 503, and a bus 504. The bus 504 is configured to connect the processor 501, the memory 502, and the network interface 503. A communication connection to another device may be implemented through the network interface 503 (which may be wired or wireless). The memory 502 stores a computer program, and the computer program is used to implement various application functions. When the modules in the network device shown in FIG. 10 are implemented by using software modules, programs corresponding to the software modules may be stored in the memory 502 of the network device.

It should be understood that in this embodiment of the present disclosure, the processor 501 may be a CPU, or the processor 501 may be another general-purpose processor, a digital signal processor (DSP), an application-specific integrated circuit (ASIC), a field-programmable gate array (FPGA), a GPU, or another programmable logical device, a discrete gate, a transistor logic device, a discrete hardware assembly, or the like. The general-purpose processor may be a microprocessor, any conventional processor, or the like.

The memory 502 may be a volatile memory or a non-volatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In addition to a data bus, the bus 504 may further include a power bus, a control bus, a status signal bus, and the like. However, for the purpose of clear descriptions, various buses are all marked as the bus 504 in the figure.

In this embodiment of the present disclosure, the processor 501 in the network device may be configured to: send a plurality of first routes to the second network device in a parallel transmission manner, and send an end indication to the second network device after determining that the second network device receives the plurality of first routes, where the plurality of first routes are used by the second network device to refresh a routing table, and the end indication indicates that the sending of the plurality of first routes has been completed. For a detailed processing process of the processor 501, refer to the foregoing method embodiments. For example, refer to the detailed descriptions of step 101 and step 102 in the embodiment shown in FIG. 3, or refer to the detailed descriptions of step 201, step 204, and step 206 in the embodiment shown in FIG. 4. Details are not described herein again.

Alternatively, the processor 501 in the network device may be configured to receive, through a network interface, the plurality of first routes sent by the first network device in the parallel transmission manner; receive the first end indication sent by the first network device; and after refreshing the routing table by using the plurality of first routes, delete a route other than the plurality of first routes from the routing table based on the first end indication, where the first end indication is sent by the first network device after the first network device determines that the second network device has received the plurality of first routes. For a detailed processing process of the processor 501, refer to the foregoing method embodiments, for example, refer to the detailed descriptions of step 103 in the embodiment shown in FIG. 3, or refer to the detailed descriptions of step 202, step 203, step 205, and step 207 in the embodiment shown in FIG. 4. Details are not described herein again.

Figure 11:
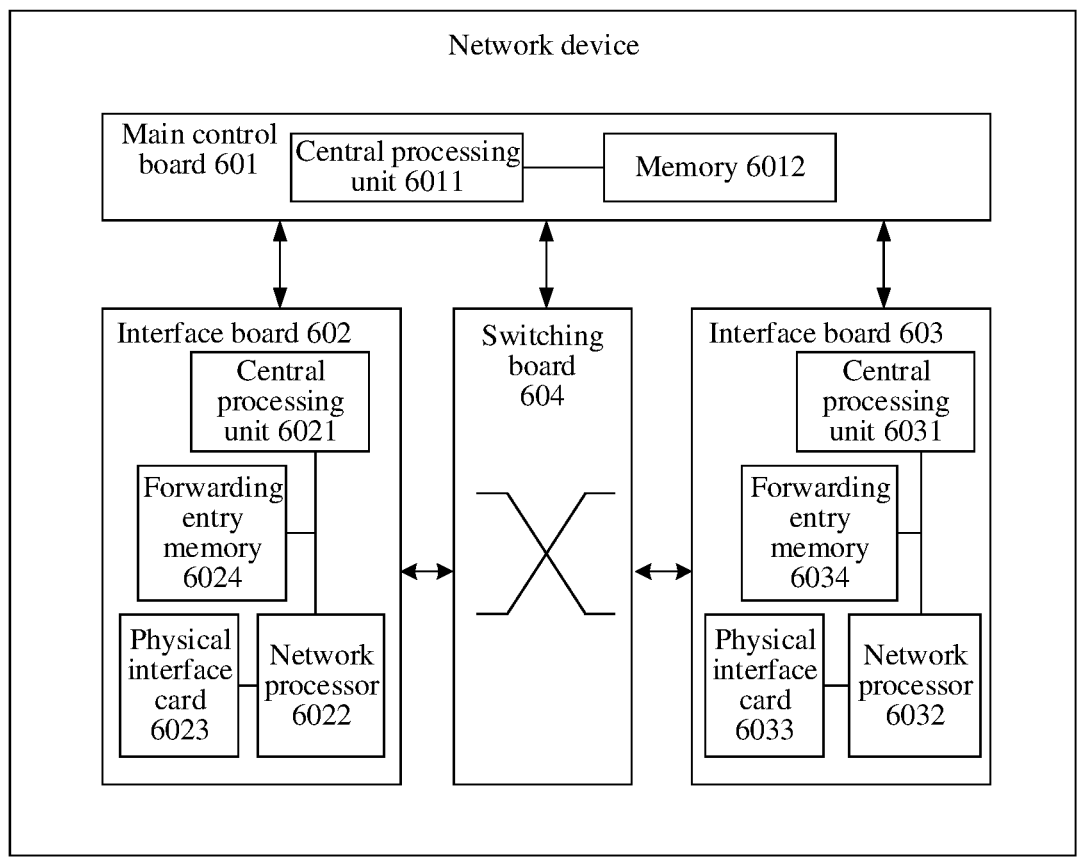
FIG. 11 is a schematic diagram of a structure of another network device according to an embodiment of the present disclosure.

FIG. 11 is a schematic diagram of a structure of another network device according to an embodiment of the present disclosure. The network device may be used in the system shown in FIG. 1 and any one of the systems shown in FIG. 5 to FIG. 7, and may be any one of the network devices in the system shown in the foregoing accompanying drawings. In addition, the network device may implement the steps performed by the first network device or the second network device in the foregoing method embodiments. As shown in FIG. 11, the network device may include a main control board 601 and at least one interface board (where the interface board is also referred to as a line card or a service board). For example, FIG. 11 shows an interface board 602 and an interface board 603. In a case of a plurality of interface boards, a switching board 604 may be included, and the switching board 604 is configured to complete data exchange between the interface boards.

The main control board 601 is configured to implement functions such as system management, device maintenance, and protocol processing. The interface board 602 and the interface board 603 are configured to provide various service interfaces (for example, a POS interface, a GE interface, and an ATM interface), and forward a packet. The main control board 601 mainly includes three types of functional units: a system management and control unit, a system clock unit, and a system maintenance unit. The main control board 601, the interface board 602, and the interface board 603 are connected to a system backboard through a system bus to implement interworking. The interface board 602 includes one or more central processing units 6021. The central processing unit 6021 is configured to control and manage the interface board 602, and communicate with a central processing unit 6011 on the main control board 601, and forward a packet. A forwarding entry memory 6024 on the interface board 602 is configured to store a forwarding entry. The central processing unit 6021 may forward the packet by searching the forwarding entry stored in the forwarding entry memory 6024.

One or more physical interface cards 6023 included in the interface board 602 are configured to receive a packet sent by a previous-hop node, and send a processed packet to a next-hop node based on an indication of the central processing unit 6021. A specific implementation process is not described herein again. Specific functions of the central processing unit 6021 are not described herein again either.

It may be understood that a sending module 301 in the first network device may be located in the interface board 602, a determining module 302 and a routing module 303 may be located in the main control board 601, and a transmission module 304 may be located in the interface board 602 or may be located in the main control board 601. A receiving module 401, a first sending module 403, and a second sending module 404 in the second network device may be located in the interface board 602. A refresh module 402 may be located in the main control board 601. One part of the connection module 405 is located in the main control board 601, and the other part is located in the interface board 602. In other words, the main control board 601 and the interface board 602 may jointly implement a function of the connection module 405.

It may be further understood that, as shown in FIG. 11, the network device may include a plurality of interface boards, and a distributed forwarding mechanism is used. In this mechanism, a structure of the interface board 603 is basically the same as a structure of the interface board 602, and an operation on the interface board 603 is basically similar to an operation on the interface board 602. For brevity, details are not described herein again. In addition, it may be understood that in FIG. 11, the central processing unit 6021 and/or a network processor 6022 in the interface board 602 may be dedicated hardware or a chip, for example, an application-specific integrated circuit may be used to implement the foregoing functions. This implementation is generally a manner of using dedicated hardware or a chip for processing on a forwarding plane. In another implementation, the central processing unit 6021 and/or the network processor 6022 may alternatively use a general-purpose processor, for example, a general-purpose CPU, to implement the foregoing functions.

In addition, it may be understood that there may be one or more main control boards 601. When there are a plurality of main control boards, a primary main control board and a secondary main control board may be included. There may be one or more interface boards, and a device having a stronger data processing capability provides more interface boards. If there are the plurality of interface boards, the plurality of interface boards can communicate with each other by using one or more switching boards, and the plurality of interface boards can jointly implement load balancing and redundancy backup. In a centralized forwarding architecture, the device may not need the switching board, and the interface board provides a function of processing service data of an entire system. In a distributed forwarding architecture, the device includes the plurality of interface boards. Data exchange between the plurality of interface boards may be implemented by using the switching board, to provide a large-capacity data exchange and processing capability. Therefore, data access and processing capability of a network device in the distributed architecture is better than data access and processing capability of a device in the centralized architecture. A specific architecture that is to be used depends on a specific networking deployment scenario. This is not limited herein.

In a specific embodiment, a memory 6012 and a memory 6024 may each be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk or another magnetic storage device, or any other medium that can be used to carry or store expected program code in a form of an instruction or a data structure and that can be accessed by a computer, but is not limited thereto. The memory 6024 in the interface board 602 may be independent, and is connected to the central processing unit 6021 via a communication bus; or the memory 6024 may be integrated with the central processing unit 6021. The memory 6012 in the main control board 601 may exist independently, and is connected to the central processing unit 6011 via a communication bus; or the memory 6012 may be integrated with the central processing unit 6011.

The memory 6024 is configured to store program code, and the central processing unit 6021 controls and executes the program code. The memory 6012 is configured to store program code, and the central processing unit 6011 controls and executes the program code. The central processing unit 6021 and the central processing unit 6011 may implement, by executing the program code, the route refresh method that is provided in the foregoing embodiments and that is applied to the first network device or the second network device. The program code stored in the memory 6024 and memory 6012 may include one or more software modules. The one or more software modules may be the functional modules provided in the embodiment in FIG. 8 or FIG. 9.

In a specific embodiment, the physical interface card 6023 may be a type of apparatus that uses any transceiver, and is configured to communicate with another device or a communication network, for example, the Ethernet, a radio access network (RAN), a wireless local area network (WLAN), or the like.

An embodiment of the present disclosure further provides a computer-readable storage medium. The computer-readable storage medium stores instructions, and the instructions are executed by a processor to implement the route refresh method performed by the first network device or the route refresh method performed by the second network device according to the foregoing method embodiments.

An embodiment of the present disclosure further provides a computer program product including instructions. When the computer program product runs on a computer, the computer is enabled to implement the route refresh method performed by the first network device or the route refresh method performed by the second network device according to the foregoing method embodiments.

An embodiment of the present disclosure further provides a chip. The chip may be configured to implement the route refresh method performed by the first network device or the second network device according to the foregoing method embodiments.

Embodiments of the present disclosure further provide a route refresh system. As shown in FIG. 1 and FIG. 5 to FIG. 7, the route refresh system includes a first network device 01 and a second network device 02. For a structure of the first network device, refer to FIG. 8, FIG. 10, or FIG. 11. For a structure of the second network device 02, refer to FIG. 9, FIG. 10, or FIG. 11.

Optionally, refer to FIG. 6. The system may further include a third network device 03. As a neighboring network device of the second network device 02, the third network device 03 may also implement the steps performed by the first network device 01 in the foregoing embodiments.

All or some of the foregoing embodiments may be implemented by using software, hardware, firmware, or any combination thereof. When the software is used to implement embodiments, all or some of the foregoing embodiments may be implemented in a form of a computer program product. The computer program product includes one or more computer instructions. When the computer program instructions are loaded or executed on a computer, all or some of the processes or the functions according to embodiments of the present disclosure are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website station, a computer, a server, or a data center to another website station, another computer, another server, or another data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device including one or more usable medium integrations, such as a server or a data center. The usable medium may be a magnetic medium (for example, a floppy disk, a hard disk, or a magnetic tape), an optical medium (for example, a DVD), a semiconductor medium. The semiconductor medium may be a solid state drive (solid state drive, SSD).

The term "at least one" in the present disclosure means one or more, and the term "a plurality of" in the present disclosure means two or more than two. For example, "a plurality of nodes" means two or more than two nodes. The terms "system" and "network" may be used interchangeably in this specification. The term "and/or" mentioned in this specification represents that three relationships may exist. For example, A and/or B may represent the following three cases: Only A exists, both A and B exist, and only B exists. A character "/" generally denotes an "or" relationship between the associated objects.

The foregoing descriptions are merely optional implementations of the present disclosure, but the protection scope of the present disclosure is not limited thereto. Any equivalent modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network device, applied to a first network device in a network, the network device comprises:
   one or more memories configured to store instructions that, when executed by one or more processors coupled to the one or more memories, cause the network device to:
   send a plurality of first routes to a second network device in a parallel transmission manner, wherein the second network device use the plurality of first routes to refresh a routing table; and
   after determining that the second network device has received the plurality of first routes, send an end indication to the second network device, wherein the end indication indicates that the sending of the plurality of first routes to the second network device has been completed,
   wherein the first network device comprises a routing processor and a transceiver, the routing processor runs a routing protocol, and the transceiver runs a transmission protocol; and wherein the one or more processors are further configured to execute the instructions to cause the network device to:
   send, by the routing processor, the plurality of first routes to the transceiver;
   receive, by the transceiver, one or more notification messages from the second network device;
   determine, based on the one or more notification messages from the second network device, whether the second network device has received the plurality of first routes; and
   after determining that the second network device has received the plurality of first routes, send, by the routing processor, the end indication to the second network device to indicate that the sending of the plurality of first routes to the second network device has been completed.

2. The network device according to claim 1, wherein the one or more processors are further configured to execute the instructions to cause the network device to:
   send, by the routing processor, the plurality of first routes and the end indication to the transceiver; and
   configure, by the routing processor, a transmission tag for the transceiver, wherein the transmission tag indicates the transceiver to send, after determining that the second network device has received the plurality of first routes, the end indication to the second network device.

3. The network device according to claim 1, wherein the one or more processors are further configured to execute the instructions to cause the network device to:
upon determining that sending of data in a data stream to which a second route belongs has been completed, send the second route to the second network device, wherein the second route refreshes any one of the first routes, or the second route is a route learned by the first network device after the first network device sends the plurality of first routes.

4. The network device according to claim 1, wherein the one or more processors are further configured to execute the instructions to cause the network device to:
send the plurality of first routes to the second network device in the parallel transmission manner based on a route refresh message sent by the second network device; or
after disconnecting from the second network device and re-establishing a connection to the second network device, send the plurality of first routes to the second network device in the parallel transmission manner.

5. The network device according to claim 1, wherein the one or more processors are further configured to execute the instructions to cause the network device to:
send the plurality of first routes in parallel through a plurality of paths between the first network device and the second network device; or
send a plurality of data streams in parallel through one path between the first network device and the second network device, wherein each data stream comprises at least one first route.

6. The network device according to claim 5, wherein the plurality of paths between the first network device and the second network device are established according to a quick user datagram protocol Internet connection (QUIC) protocol.

7. A network device, applied to a second network device in a network, the network device comprises:
one or more memories configured to store instructions that, when executed by one or more processors coupled to the one or more memories, cause the network device to:
receive a plurality of first routes sent by a first network device in a parallel transmission manner;
send one or more notification messages to the first network device, the one or more notification messages indicate whether the second network device has received at least one of the plurality of first routes;
receive a first end indication sent by the first network device, wherein the first end indication is sent by the first network device after the first network device determines that the second network device has received the plurality of first routes based on the one or more notification messages, wherein the first end indication indicates that the sending of the plurality of first routes to the second network device has been completed; and
after refreshing a routing table by using the plurality of first routes, delete a route other than the plurality of first routes from the routing table based on the first end indication.

8. The network device according to claim 7, wherein the one or more processors are further configured to execute the instructions to cause the network device to:
receive a second route sent by the first network device, wherein the second route is sent by the first network device after the first network device determines that sending of data in a data stream to which the second route belongs has been completed, and the second route refreshes any one of the first routes, or the second route is a route learned by the first network device after the first network device sends the plurality of first routes; and
refresh the routing table by using the second route.

9. The network device according to claim 7, wherein the one or more processors are further configured to execute the instructions to cause the network device to:
after refreshing a route receiving policy for the first network device, send a route refresh message to the first network device, wherein the route refresh message indicates the first network device to send the plurality of first routes; and
delete a target route other than the plurality of first routes from the routing table based on the first end indication, wherein the target route is a route learned from the first network device before the route refresh message is sent.

10. The network device according to claim 7, wherein the one or more processors are further configured to execute the instructions to cause the network device to:
after disconnecting from a plurality of neighboring network devices and restarting a routing protocol, re-establish connections to the plurality of neighboring network devices, wherein the plurality of neighboring network devices comprises the first network device and a third network device;
receive a plurality of third routes sent by the third network device in the parallel transmission manner; and
receive a second end indication sent by the third network device, wherein the second end indication is sent by the third network device after the third network device determines that the second network device has received the plurality of third routes; and
after refreshing the routing table by using the plurality of first routes and the plurality of third routes, delete a route other than the plurality of first routes and the plurality of third routes from the routing table based on the first end indication and the second end indication.

11. The network device according to claim 10, wherein the routes sent by the first network device and the routes sent by the third network device all belong to a target address family; and
wherein the one or more processors are further configured to execute the instructions to cause the network device to:
delete, from the routing table based on the first end indication and the second end indication, a route that belongs to the target address family and that is other than the plurality of first routes and the plurality of third routes.

12. A network system comprising a first network device and a second network device, wherein
the first network device is configured to:
send a plurality of first routes to the second network device in a parallel transmission manner, wherein the second network device uses the plurality of first routes to refresh a routing table; and
after determining that the second network device has received the plurality of first routes, send an end indication to the second network device, wherein the end indication indicates that the sending of the plurality of first routes from the first network device to the second network device has been completed; and the second network device is configured to:

receive the plurality of first routes sent by the first network device;

receive the end indication sent by the first network device; and after refreshing a routing table by using the plurality of first routes, delete a route other than the plurality of first routes from the routing table based on the end indication, wherein the first network device comprises a routing processor and a transceiver, the routing processor runs a routing protocol, and the transceiver runs a transmission protocol; and wherein the first network device is further configured to:

send, by the routing processor, the plurality of first routes to the transceiver;

receive, by the transceiver, one or more notification messages from the second network device;

determine, based on the one or more notification messages from the second network device, whether the second network device has received the plurality of first routes; and after determining that the second network device has received the plurality of first routes, send, by the routing processor, the end indication to the second network device to indicate that the sending of the plurality of first routes to the second network device has been completed.

13. The network system according to claim 12, wherein the first network device is further configured to:

send, by the routing processor, the plurality of first routes and the end indication to the transceiver; and configure, by the routing processor, a transmission tag for the transceiver, wherein the transmission tag indicates the transceiver to send, after determining that the second network device has received the plurality of first routes, the end indication to the second network device.

14. The network system according to claim 12, wherein the first network device is further configured to:

upon determining that sending of data in a data stream to which a second route belongs has been completed, send the second route to the second network device, wherein the second route refreshes any one of the first routes, or the second route is a route learned by the first network device after the first network device sends the plurality of first routes.

15. The network system according to claim 12, wherein the first network device is further configured to:

send the plurality of first routes to the second network device in the parallel transmission manner based on a route refresh message sent by the second network device; or after disconnecting from the second network device and re-establishing a connection to the second network device, send the plurality of first routes to the second network device in the parallel transmission manner.

* * * * *